United States Patent [19]

Sasaki et al.

[11] Patent Number: 5,200,680
[45] Date of Patent: Apr. 6, 1993

[54] FEED SPEED CONTROL METHOD FOR A NUMERICAL CONTROL DEVICE

[75] Inventors: Takao Sasaki, Hachioji; Kentaro Fujibayashi, Musashino; Toshiaki Otsuki, Hino; Yasuhiro Saito, Minamitsuru, all of Japan

[73] Assignee: Fanuc Ltd., Japan

[21] Appl. No.: 651,267

[22] PCT Filed: Aug. 10, 1990

[86] PCT No.: PCT/JP90/01028
§ 371 Date: Apr. 15, 1991
§ 102(e) Date: Apr. 15, 1991

[87] PCT Pub. No.: WO91/03778
PCT Pub. Date: Mar. 21, 1991

[30] Foreign Application Priority Data

Aug. 29, 1989 [JP] Japan .................................. 1-221963

[51] Int. Cl.$^5$ ..................... G05B 19/407; G05B 13/00
[52] U.S. Cl. .................................. 318/571; 318/560; 318/610
[58] Field of Search ................ 318/560–646; 364/474.1–474.18

[56] References Cited

U.S. PATENT DOCUMENTS 4,757,457 7/1988 Matsumoto .
5,107,193 4/1992 Iwashita .............................. 318/560

FOREIGN PATENT DOCUMENTS

3545795A1 12/1985 Fed. Rep. of Germany .
3518513 6/1970 Italy .
63-224932 3/1990 Japan .
1-15595 8/1990 Japan .

Primary Examiner—Paul Ip
Attorney, Agent, or Firm—Staas & Halsey

[57] ABSTRACT

A feed speed control method for a numerical control device in which a feed speed of a tool traveling along an instructed machining path is controlled in accordance with a machining program. The speed of each axis is derived (S2), and the acceleration of each axis is derived from a speed variation between adjacent blocks (S3). When the acceleration ($\Delta Vx$) is larger than a permissible acceleration ($\Delta Vxmax$) (S4), first ratios (K1) of the permissible accelerations to the accelerations are derived for individual axes (S5), and the smallest of the first ratios is selected. The command speed is multiplied by the square root of the smallest first ratio to derive an actual feed speed (S9). In this way, shock to a machine is reduced and an excessive load on a servomotor is reduced even when blocks continue for successive infinitesimal distribution distances, as in the case wherein a curve is approximated by the use of straight lines.

5 Claims, 5 Drawing Sheets

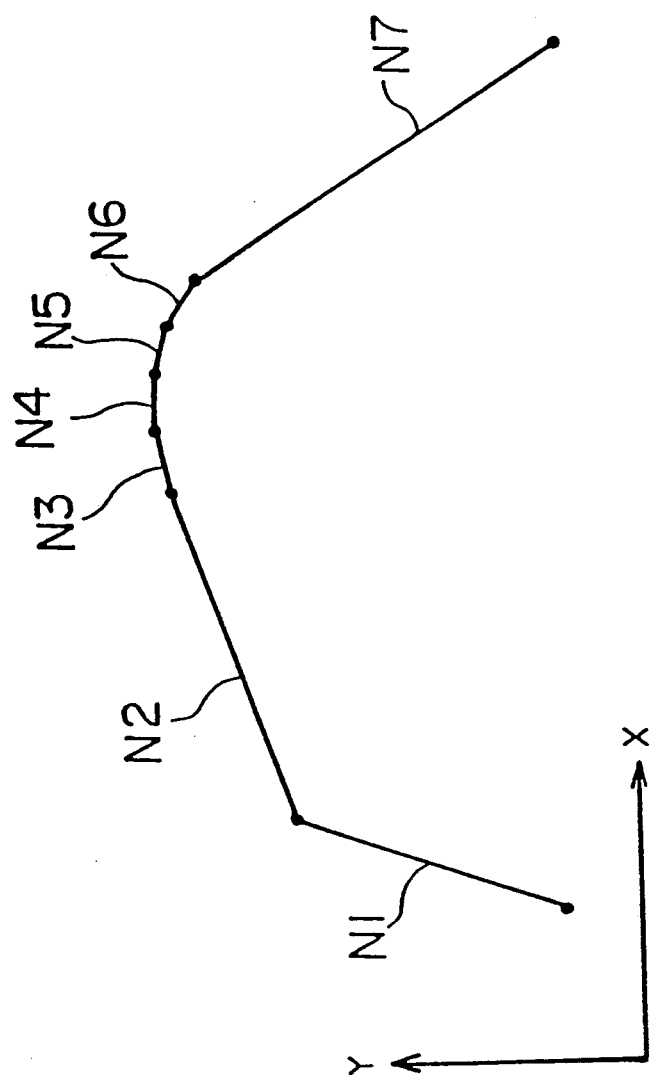
F I G. 3

5,200,680

FEED SPEED CONTROL METHOD FOR A NUMERICAL CONTROL DEVICE

BACKGROUND OF THE INVENTION

1. Field of the Invention

This invention relates to a feed speed control method for a numerical control device, and more particularly, to a feed speed control method for a numerical control device by which a correct feed speed is automatically derived.

2. Background of the Related Art

In numerical control devices (CNC), a workpiece is machined to a desired shape by moving a tool at a commanded speed along a machining path instructed by a machining program.

To efficiently effect the machining operation at a high precision, the machining speed for each block must be determined by taking into account the shape to be machined, the maximum torque of a motor, the degree of shock to a machine, and the like. In particular, when a machining program is prepared, an exact stop command is inserted at, for example, a corner portion of an instructed path for a workpiece at which the cutting direction is greatly changed.

To create such a program, however, a relatively high level of skill, and a great deal of labor are required. Namely, a programmer must determine an optimum machining speed (feed speed) by taking the machine tool, the shape of a workpiece, and the like into consideration.

Further, if the machining speed is set to a value which is unnecessarily low in comparison with the high performance machining speed of the machine tool, when the program is prepared, a problem arises in that the performance of the machine tool cannot be fully utilized.

The inventors of this invention proposed, in Japanese Patent Application No. 63-224932, a method of deriving a feed speed which causes a speed variation of each axis at a corner portion to be smaller than a maximum permissible speed difference derived from a predetermined maximum permissible torque, for the control of the speed.

Further, as a related application, a method of controlling the acceleration/deceleration was proposed in Japanese Patent Application No. 1-15595, which method can reduce a load caused by a repetition of an acceleration/deceleration of a servomotor when blocks continue for infinitesimal distribution distances.

The method proposed in Japanese Patent Application No. 63-224932 is effective for a corner portion with a large angular variation, but a correct feed speed cannot be derived where individual speed variations are small but an actual acceleration for each axis is large, because the variations occur successively in a short time; for example, in the case of a free curve approximately represented by straight lines. In this case, the mechanical shock may be disadvantageously increased and an excessively large load may be applied to a servomotor.

SUMMARY OF THE INVENTION

This invention has been made in view of the above circumstances, and an object thereof is to provide a feed speed control method for a numerical control device by which shock to the machine can be reduced. Further, another object of this invention is to provide a feed speed control method for a numerical control device by which the occurrence of shock to a machine or an excessively large load on a servomotor can be prevented during the execution of a machining program containing successive infinitesimal distribution distances.

In this invention, to solve the above problem, there is provided a feed speed control method for a numerical control device by which a feed speed of a tool traveling along an instructed machining path is controlled in accordance with a machining program, wherein an acceleration of each axis is derived based on a variation in the speeds of adjacent blocks for each axis, and the distribution distances and speeds of the adjacent blocks. In addition, a first ratio of a permissible acceleration to the acceleration of each axis is derived when the acceleration of each axis is larger than a permissible acceleration/deceleration, the smallest of the first ratios of the respective axes is selected, and the command speed is multiplied by the square root of the smallest first ratio to derive an actual or approximated feed speed.

An acceleration of each axis is derived based on a variation in speed at a corner portion of each block, and the distribution distances of the blocks before and after the corner, and a feed speed which makes the acceleration smaller than the maximum permissible acceleration is derived to effect the speed control.

As a result, it is possible to reduce shock to the machine which may occur in the blocks having successive infinitesimal distribution distances, where a curve is approximated by straight lines, for example, and thus an excessively large load on the servomotor can be prevented.

BRIEF DESCRIPTION OF THE DRAWINGS

FIG. 3 is a diagram showing an example of an actual machining path; and

DETAILED DESCRIPTION OF THE PREFERRED EMBODIMENT

An embodiment of this invention will be described with reference to the accompanying drawings.

FIG. 3 is a diagram showing an example of an actual machining path. In this figure, N1 to N7 indicate the machining paths of individual blocks. In this case, the machining path lies in an XY plane and the speed of each axis is greatly varied, although the command speed is constant over a specific machining path. For example, the speed in the X-axis direction is small in the block N1, but becomes high in the block N2 because an angle of the machining path with respect to the X-axis becomes small.

Figure 4:
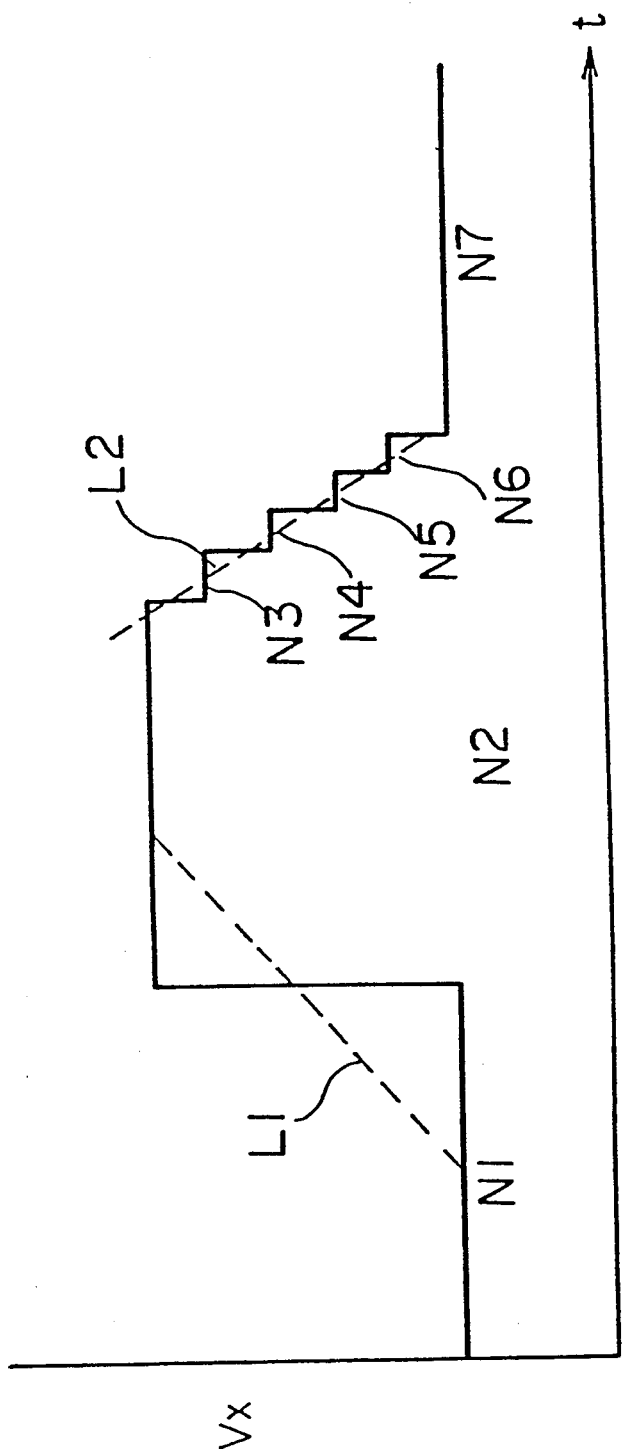
FIG. 4 is a graph showing a speed in an X-axis direction when a machining operation is effected at a constant command feed speed.

FIG. 4 is a graph showing a speed in the X-axis direction when a machining operation is effected at a constant command feed speed. In this case, the abscissa indicates time (t) and the ordinate indicates a velocity Vx in the X-axis direction. Since a large speed difference exists at a corner between the blocks N1 and N2, a deceleration may be considered necessary because the speed difference is larger than the permissible or threshold speed difference, when employing a conventional method or a method in which the permissible speed difference and the speed difference between the blocks are compared to reduce the speed.

On the other hand, since a variation in speed is smaller than the permissible speed difference at corner portions between the blocks N2 and N3 and between the blocks N3 and N4, a deceleration is considered unnecessary when using the conventional method. In practice, however, a large speed variation exists overall from the block N2 to N7. For example, the speed difference between the blocks N1 and N2, i.e., the acceleration, can be expressed by the broken or dashed line L1. On the other hand, speed variations between the blocks N2 and N3 and between the blocks N3 and N4, i.e., acceleration in these blocks, can be expressed by the broken line L2. The latter acceleration may be larger than the acceleration expressed by the broken line L1, and accordingly, an excessively large load may be applied to the motor or the machine may suffer an excessively large shock.

Therefore, the variation rate of speed or the acceleration must be made less than a permissible value, in addition to the magnitude of the speed variation. The acceleration is derived by the following equation.

$$a = (Vm - Vn)/min\{(1m/Fm), (1n/Fn)\}$$

In the above equation, $min\{(1m/Fm), (1n/Fn)\}$ means that the smallest of the elements in the brackets { } is used. The elements in equation (1) are discussed in detail below. Next, assuming that the accelerations in the X-axis, Y-axis and Z-axis directions are A(X), A(Y), and A(Z), and the maximum permissible accelerations thereof are Ap(X), Ap(Y) and Ap(Z), respectively, then an actual feed speed F at a corner is derived by the following equation.

$$F = Fcmin\{(Ap(X)/A(X), Ap(Y)/A(Y), Ap(Z)/A(Z)\}^{\frac{1}{2}} \quad (2)$$

The elements in equation (2) are discussed below. A smooth and high-precision machining operation in which no shock is given to the machine and an excessively large load is not applied to the motor can be performed by effecting a control such that a smaller of the feed speed F and a feed speed derived by the conventional method is selected as a feed speed at a corner.

Figure 1A:
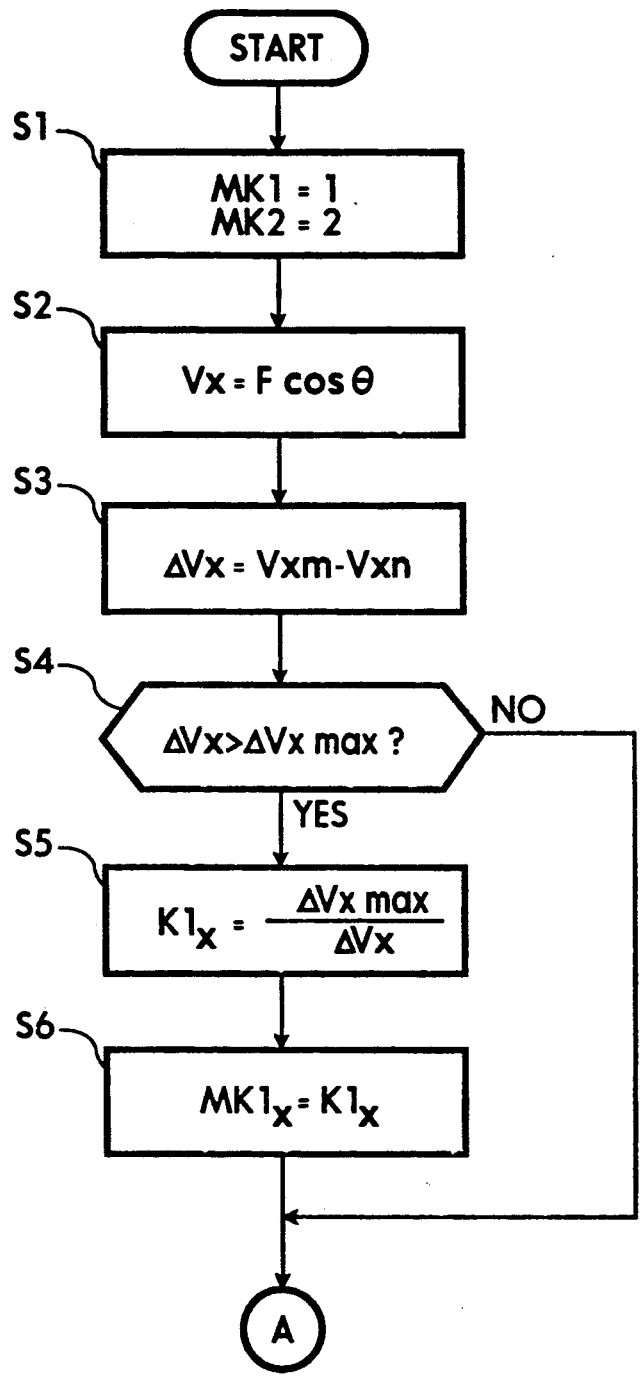
FIG. 1(a) and FIG. 1(b) are flowcharts illustrating a feed speed control method for a numerical control device according to this invention.
Figure 1B:
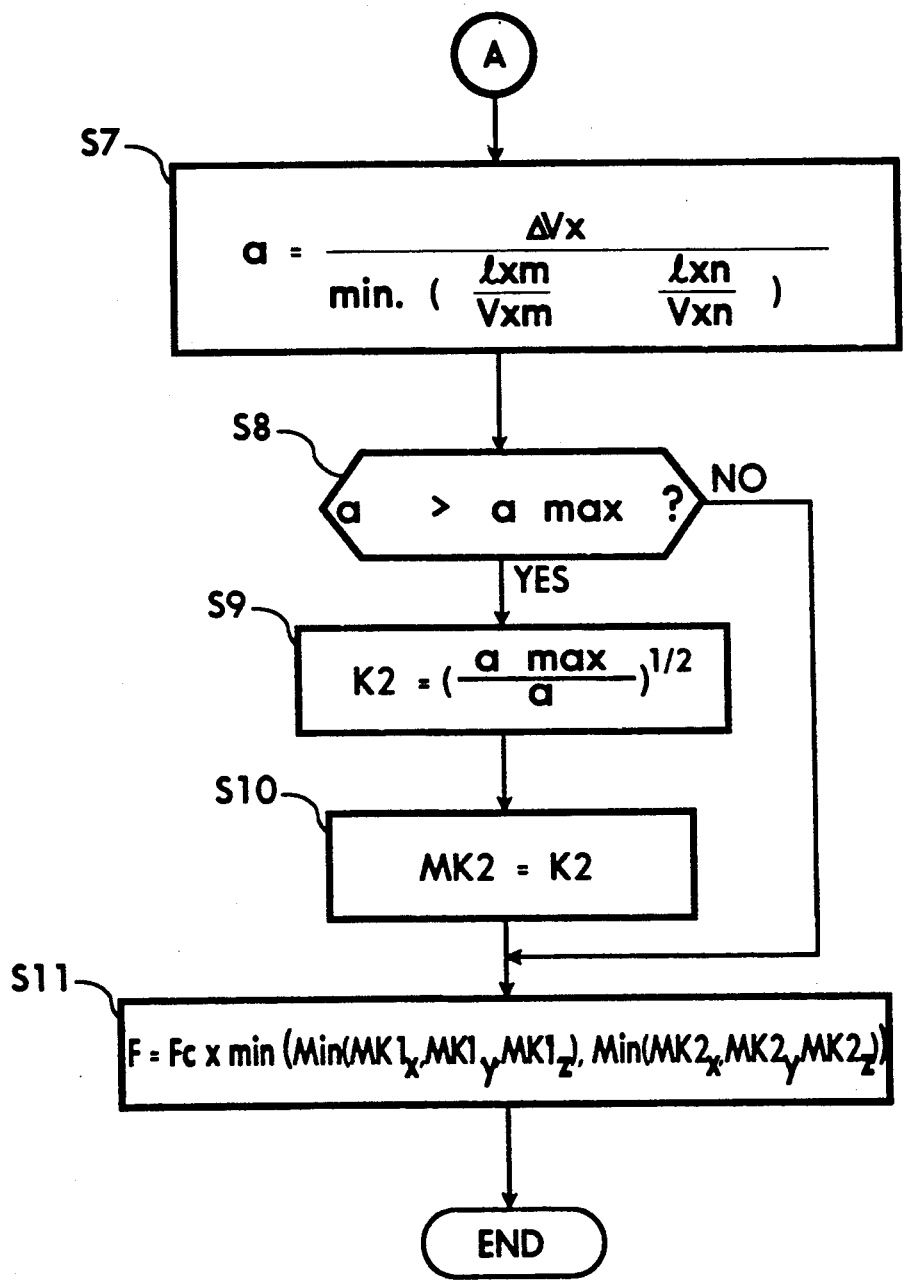

FIGS. 1(a) and 1(b) are flowcharts illustrating a feed speed control method for a numerical control device according to this invention. In these figures, a numeral following "S" indicates a step number. In practice, the ratio of the permissible speed difference to the speed difference and the ratio of the permissible acceleration to the acceleration are derived for each axis, and then the smallest of the ratios is selected. The flowcharts, however, describe only the ratio with respect to the X-axis, for the sake of simplicity.

S2 to S6 are steps for deriving the ratio of the permissible speed difference to the speed difference, and S7 to S10 are steps for deriving the ratio of the permissible acceleration to the acceleration, and the smaller of these ratios is selected in S11 to determine the actual feed speed.

[S1] A variable MK1 and a variable MK2 are set to "1." The variable MK1 is the speed ratio and the variable MK2 is the acceleration ratio.

[S2] The speed Vx along the X-axis corresponding to the command speed F is derived. In the case of a machining path in the XY plane, this can be derived by $$Vx = F \cos \theta$$

assuming that an angle between the machining path and the X-axis is $\theta$.

[S3] A difference $\Delta Vx$ in speed between blocks is derived by the following equation.

$$\Delta Vx = Vxm - Vxn \quad (4)$$

where Vxm denotes the speed of the preceding block along the X-axis and Vxn denotes the speed of the current block along the X-axis.

[S4] It is determined whether or not the speed difference $\Delta Vx$ between the blocks is larger than the permissible speed difference $\Delta Vxmax$. If the former is larger than the latter, it is necessary to reduce the speed, and thus S5 is executed; if not, S7 is executed.

[S5] The ratio of the permissible speed difference $\Delta Vxmax$ the speed difference $\Delta Vx$ is derived and is set as K1. K1 is a value used for the reduction of the speed.

[S6] K1 is substituted for the variable MK1.

[S7] An acceleration $\alpha$ is derived by the following equation.

$$\alpha_x = \Delta Vx/min\{(1xm/Vxm), (1xn/Vxn)\}$$

where
$\Delta Vx$: the speed difference in the X-axis direction at a corner;
1xm: the distance of travel of the preceding block; X-direction
1xm: the distance of travel of the current block X-direction.

Further, $min\{(1xm/Vxm), (1xn/Vxn)\}$ indicates that the smaller of the elements in the brackets is selected.

[S8] It is determined whether or not the derived acceleration $\alpha_x$ is larger than the permissible acceleration $\alpha max$, and if the former is larger than the latter, S9 is executed; if not, S11 is executed.

[S9] The square roots of the permissible acceleration $\alpha max$ and acceleration $\alpha$ are derived.

$$K2_x = (\alpha max/\alpha_x)^{\frac{1}{2}} \quad (6)$$

where K2 is the ratio used for the reduction of the feed speed and derived from the acceleration.

[S10] The ratio $K2_x$ is substituted for the variable MK2.

[S11] The smaller of the ratio MK1(K1) derived from the speed difference and the ratio MK2(K2) derived from the ratio of the accelerations is selected for the actual command feed speed, and is multiplied by the command feed speed Fc to derive an actual or new feed speed F.

Thus, shock to the machine and excessive load on the servomotor can be prevented by reducing the feed speed, to thereby enhance the machining precision.

Figure 2:
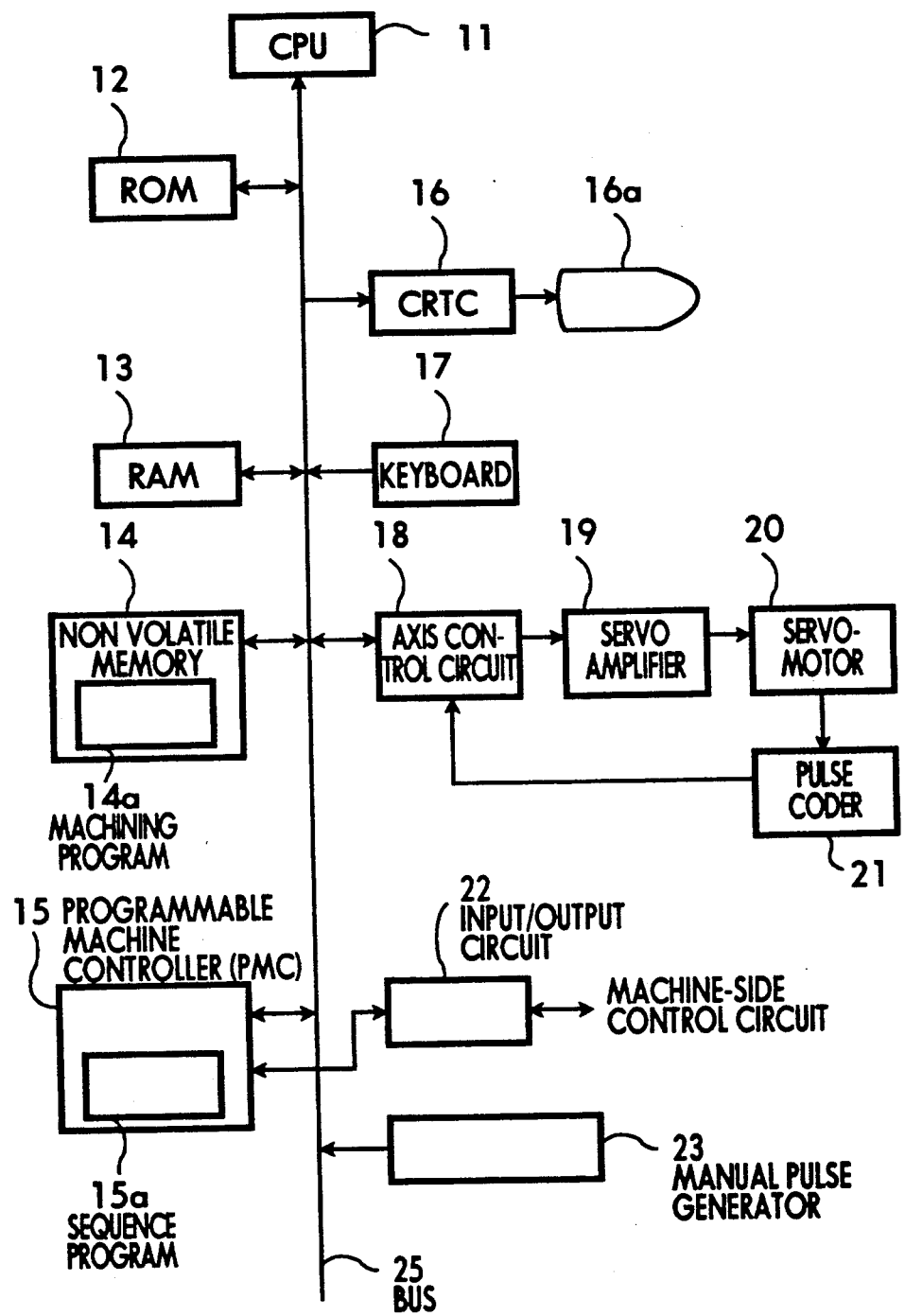
FIG. 2 is a block diagram showing hardward of the numerical control device (CNC) for carrying out this invention.

FIG. 2 is a block diagram of hardware of the a numerical control device (CNC) for carrying out this invention. A processor 11 controls the entire numerical control device in accordance with the system program stored in a ROM 12, which is an EPROM or EEPROM. A DRAM is used as a RAM 13 for storing various data. A nonvolatile memory 14 is used for storing a machining program 14a, parameters and the like, and the contents thereof can be preserved after the power supply to the numerical control device is cut off since a CMOS or the like backed up by a battery may be used. Further, parameters such as the permissible acceleration αmax and the permissible speed difference ΔVmax are also stored in the nonvolatile memory 14.

A PMC (programmable machine controller) 15 receives commands such as M function, S function and T function, decodes and processes the commands in accordance with the sequence program 15a, and outputs a signal for controlling the machine tool. Further, a signal from a limit switch on the machine side or a switching signal from a machine control panel is received by the input/output circuit 22, the signals are read by the PMC 15 and processed in accordance with the sequence program 15a. An output signal for controlling the machine side is output, from the PMC and a signal for the numerical control device is supplied to the RAM 13 via a bus 25 and read by the processor (CPU) 11.

A graphic control circuit (CRTC) 16 converts data stored in the RAM 13, such as current positions, traveled distances, etc. of the individual axes, into display signals, and supplies the same to a display unit 16a at which they are displayed. A CRT, liquid crystal display unit or the like is used for the display unit 16a, and a keyboard 17 is used for inputting various data.

An axis control circuit 18 receives a position command from the processor 11 and outputs a speed command signal to a servo amplifier 19 to control a servomotor 20. Namely, the servo amplifier 19 amplifies the speed command signal to drive the servomotor 20. The servomotor 20 is connected to a pulse coder 21 for outputting a position feedback signal, and the pulse coder 21 feeds back a position feedback pulse to the axis control circuit 18. Instead of the pulse coder 21, a position detector such as a linear scale may be used. These elements must be provided in a number thereof corresponding to that of the axes, but in this example, only the elements for one axis are shown because these elements all have the same construction.

An input/output circuit 22 transfers input/output signals with respect to the machine side, i.e., receives a limit switch signal from the machine side and a switching signal from the machine control panel, which signals are read by the PMC. Further, the input/output circuit receives a signal for controlling pneumatic actuator or the like on the machine side, output from the PMC 15, and outputs the same to the machine side.

A manual pulse generator 23 is used to output a pulse train for moving the individual axes at a high precision in accordance with a rotation angle, and to determine the machine position at a high precision. The manual pulse generator 23 is normally mounted on the machine control panel.

In FIG. 2 a spindle motor, a spindle amplifier and a spindle control circuit for controlling a spindle are omitted.

Further, only one processor is used here, but a multi-processor system having a plurality of processors can be used, depending on the system.

As described above, according to this invention, since the feed speed may also be reduced in accordance with the permissible acceleration and the acceleration between the blocks, an excessively large shock to the machine and the occurrence of machining error caused by a failure of the motor to follow the command can be prevented. As a result, the machining precision is enhanced and the reliability of the machine is improved.

We claim:

1. A feed speed control method for a numerical control device controlling a servomotor driving a tool at a feed speed and traveling along an instructed machining path in accordance with a machining program, the feed speed control method comprising the steps of:
   (a) computing an approximated acceleration of each axis of each plane on which the tool travels on the instructed machining path based on a difference in speed between adjacent blocks and distribution distances and speeds of the adjacent blocks according to: $\alpha = \Delta V/\text{minimum}(lm/Vm, ln/Vn)$ where $\alpha$ is the approximated acceleration, $\Delta V$ is the difference in speed between the adjacent blocks and minimum($lm/Vm$, $ln/Vn$) is the minimum value of each of the distribution distances divided by each of the respective speeds of the adjacent blocks;
   (b) computing first ratios of a permissible acceleration to the approximated acceleration for each axis when one of the approximated acceleration of each axis is larger than a permissible acceleration according to: $K2 = (\alpha max/\alpha)$ where K2 is the first ratios and αmax is the permissible acceleration;
   (c) selecting a smallest first ratio of the first ratios of each axis; and
   (d) computing an actual feed speed by multiplying the smallest first ratio with a command speed according to: $F = Fc \text{ minimum}(K2)$ where F is the actual feed speed and Fc is the command feed speed and controlling the device responsive to the actual feed speed.

2. A feed speed control method for a numerical control device according to claim 1, further comprising, before said step (d), the steps of:
   (i) comparing the difference in speed and a permissible speed difference of each axis between the adjacent blocks, and deriving second ratios of the permissible speed difference to the difference in speed for each axis when one of the difference in speed for each axis is larger than the permissible speed difference;
   (ii) selecting a smallest of the second ratios associated with the individual axes; and
   (iii) computing the actual feed speed by multiplying a smaller of the first and second ratios by the command feed speed.

3. A feed speed control method for a numerical control device according to claim 1, wherein said computing step (a) further comprises the step of computing the approximated acceleration $\alpha$ for each axis using the following equation, $$\alpha = (Vm - Vn)/min\{(lm/Fm), (ln/Fn)\}$$

(where (Vm−Vn) is the difference in speed of each axis at a corner; lm is a distance of travel of a preceding block; and ln is a distance of travel of a current block); and wherein said computing step (d) further comprises the step of computing the actual feed speed F using the following equation when the approximated acceleration $\alpha$ is larger than a maximum permissible acceleration αmax, which is separately set, $$F = Fc \times (\alpha max/\alpha)$$

(where αmax is the maximum permissible acceleration, Fc is a command speed and α is the acceleration).

4. A feed speed control method for a numerical control device controlling a servomotor driving a tool at a feed speed and traveling along an instructed machining path in accordance with a machining program stored in a first memory, the feed speed control method comprising the steps of:
   (a) computing an approximated acceleration for each axis of each plane on which the instructed machining path travels based on a difference in speed between adjacent blocks and distribution distances and speeds of the adjacent blocks;
   (b) computing first ratios of a permissible acceleration to the approximated acceleration for each axis when the approximated acceleration of each axis is larger than a permissible acceleration stored in a second memory;
   (c) selecting a smallest first ratio of the first ratios of each axis; and
   (d) computing an actual feed speed using the smallest first ratio and the command speed and outputting the actual feed speed and controlling the servomotor responsive to the actual feed speed.

5. A feed speed control method for a numerical control device controlling a tool at a feed speed and traveling along an instructed machining path, comprising the steps of:
   (a) computing an approximated acceleration of each axis of each plane on which the tool travels according to:

$$a = \Delta V / \text{minimum}(1m/Vm, 1n/Vn);$$

(b) computing first ratios when one of the approximated acceleration of each axis is larger than a permissible acceleration according to:

$$K2 = (amax/a);$$

(c) selecting a smallest first ratio of the first ratios of each axis;
   (d) computing an actual feed speed according to:

$$F = Fc \ \text{minimum}(K2); \text{ and}$$

(e) controlling the device responsive to the actual feed speed.

* * * * *